C. H. ROBINS.
DRAFTING TOOL.
APPLICATION FILED NOV. 9, 1910.
Reissued Mar. 4, 1913. 13,541.
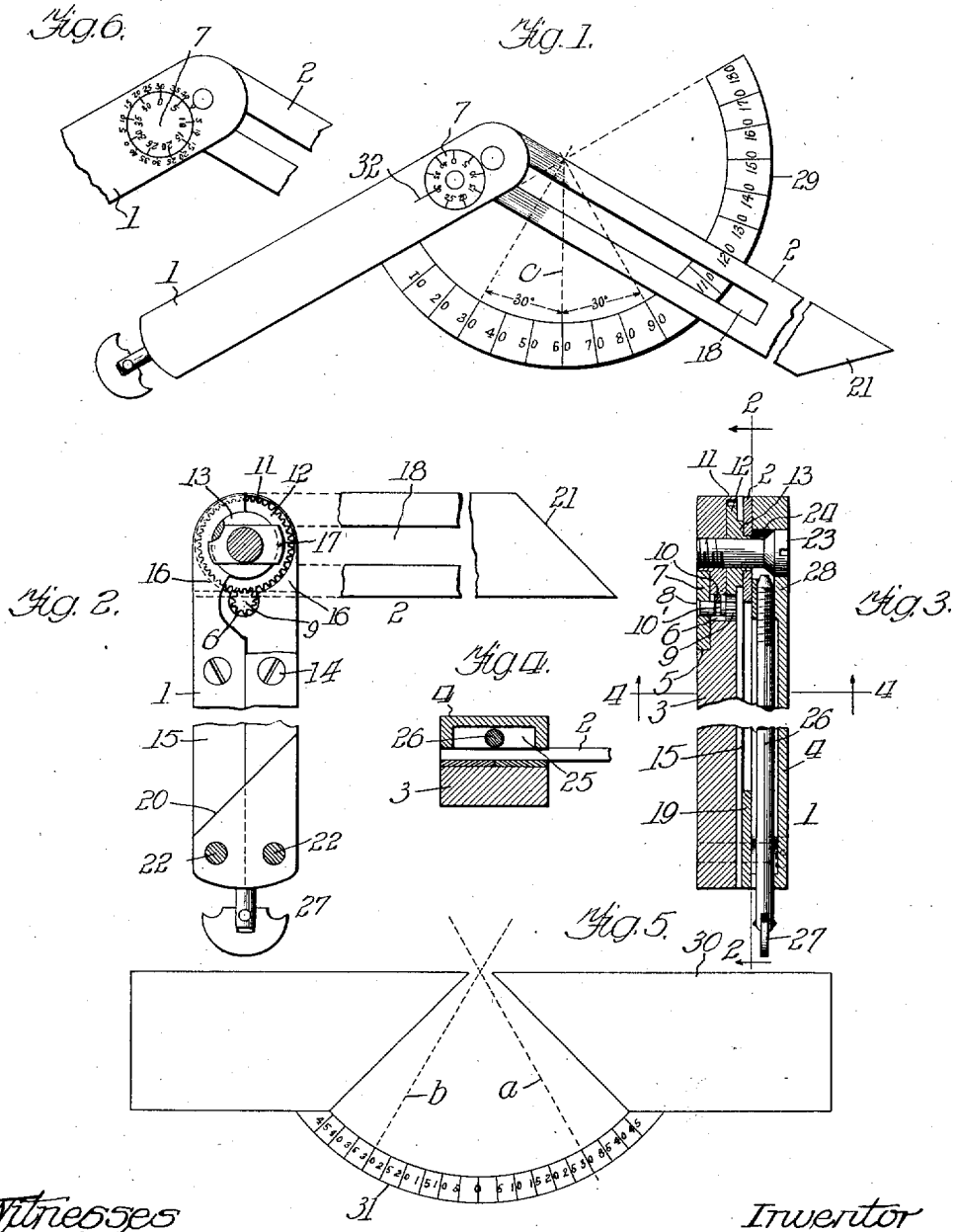
Witnesses
Robert N. Weir
C. Paul Parker
Inventor
Charles H. Robins
By Luther L. Millington
Atty.
COLUMBIA PLANOGRAPH CO., WASHINGTON, D. C.

UNITED STATES PATENT OFFICE.

CHARLES H. ROBINS, OF COEUR D'ALENE, IDAHO.

DRAFTING-TOOL.

13,541. Specification of Reissued Letters Patent. Reissued Mar. 4, 1913.

Original No. 903,779, dated November 10, 1908, Serial No. 421,692. Application for reissue filed November 9, 1910. Serial No. 591,526.

*To all whom it may concern:*

Be it known that I, CHARLES H. ROBINS, a citizen of the United States, residing at Coeur d'Alene, in the county of Kootenai and State of Idaho, have invented a new and useful Drafting-Tool, of which the following is a specification.

This invention relates to instruments for measuring and determining angles.

The invention has especial reference to such instruments for use in connection with miter boxes for taking angles and indicating the degree of the bi-secting line of such angle, or the degree on which the miter saw would be set to cut the joint of such angle.

Referring to the accompanying drawings, in which like parts are designated by similar characters, Figure 1 represents an instrument constructed in accordance with this invention, shown as set for use in connection with an ordinary form of protractor. Fig. 2 is a sectional view with parts broken away taken in the plane of line 2 2 of Fig. 3. Fig. 3 is a view in longitudinal section showing the interior construction of the instrument. Fig. 4 is a section view on line 4 4 of Fig. 3. Fig. 5 is a diagrammatic view of a miter box base provided with a protractor to illustrate the use of the instrument. Fig. 6 is a detail view with parts broken away, showing a modification of the invention.

The measuring instrument is constructed with a handle 1 and a blade 2 hinged thereto. The handle is formed of two members 3 and 4, the member 3 being preferably solid, but may be hollow for the sake of lightness, if desired. The member 3 is provided adjacent to one end with a circular recess 5 and a smaller circular recess 6 communicating with said circular recess 5, and in said circular recess 5 is located a dial 7 mounted on a shaft 8 having at its rear end a pinion 9, the parts being held in said recesses by a pin 10 engaging the circular slot 10′ in the pin 8. The member 3 is further provided with a circular recess 11 opening into the recess 6, and in the recess 11 is located a gear wheel 12 engaging and meshing with the pinion 9. The ratio of pinion 9 to gear wheel 12 is as 1 to 4. The toothed wheel 12 is formed with a circular head 13. Two plates 15 may be secured on the member 3 by means of screws 14, said plates having at their outer ends semi-circular projections 16 which encircle the head 13 of the toothed wheel 12. The head 13 of the toothed wheel 12 is formed with an oblong angular lug 17, and the blade 2 is connected therewith by a slot 18 in said blade fitting over the lug 17 and adapting the blade 2 to be slid endwise thereon. Between the members 3 and 4 at the rear end of the handle is located a plate 19 having a diagonal edge 20, as shown in Fig. 2, against which is adapted to rest the diagonal edge 21 of the blade 2 when it is in closed position in the handle. The members 3 and 4 are secured together at their rear end by screws 22 passing through the members 3 and 4 and the plates 19 and 15. In the outer end of the handle is located a screw 23 having its head mounted in a circular recess 24 in the member 4, the shank of said screw passing through the lug 17 and the toothed wheel 12, and being threaded in the member 3.

The member 4 is formed with a hollow or cored out recess 25 in which is located a rod 26 having a handle 27 at one end, and having its forward end engaging a lug 28 in the member 4 by means of a screw thread. The blade 2 may be locked in adjusted position by screwing the rod 26, its outer end impinging against the under side of the head of the screw 23, thereby drawing the forward ends of the handle members 3 and 4 inwardly or toward each other, and clamping the blade 2 and the other parts mounted on the screw 23 against movement. By having the blade 2 slotted as set forth, the blade may be adjusted and moved backward and forward on the lug 17, and may be swung to open or closed position, and when not in use may be closed into the handle with its diagonal end resting against the diagonal edge 20 of the plate 19.

In Fig. 1 is shown a diagrammatic protractor 29, and in Fig. 5 a miter box 30 and protractor 31 to assist in understanding the use of the instrument. As is well known to those familiar with the modern form of miter box, the zero line upon the protractor 31 is at right angles with the length of the miter box, and said protractor has graduations numbered from 5 to 45 at both sides of said zero line. The lines upon said protractor 31 are numbered with reference to the said zero or right angle line instead of with reference to the edge of the miter box base. Thus the graduation line marked 30 (indicated by dotted line *a*, Fig. 5) is 30° from the zero line. The latter line is 90° from the edge of the miter box base; therefore the said graduation line 30, or dotted line *a*, is 90° plus 30°, or 120° (in one direction) from the edge of the miter box base. Now let us suppose that it is desired to fit together two pieces of molding, for instance, so that the pieces extend at the angle of 120° from each other. The angle at which the ends of the pieces must be cut is, of course, one-half of the angle 120°. In other words, the line upon which the pieces are cut must bisect the angle 120°, at which angle the pieces are to extend with each other. This bisecting line is indicated at *b* in Fig. 5, and as may be seen passes through the graduation mark 30 at the side of the zero line opposite the line *a*. Therefore the proper place to set the saw for the cut to bisect the angle of 120° is the last mentioned graduation line, numbered 30.

As shown by way of example in Fig. 1, the instrument is set at the angle 120°, the line *c* which bisects said angle passing through the 60° mark upon the protractor 29. As the 60° line is spaced 30° from the 90° line (corresponding to the zero line on protractor 31), the proper point at which the miter box would be set would be the 30° line upon the protractor 31, in order that the molding or other material may be cut at the proper angle, as above explained. Referring to Fig. 1 it may be seen that the line numbered 30 upon the dial 7 registers with the index line 32 upon the handle, which indicates immediately that the saw of the miter box (Fig. 5) should be set at 30° in order to obtain a cut which corresponds to a bisection of the 120° angle indicated in Fig. 1. The dial in order to accurately obtain these measurements is provided on its surface adjacent to its periphery with graduation marks numbered from zero to forty-five. It will thus be seen that to indicate the degree of angle at which molding should be cut, the tool should be placed in position in the angle that the pieces of molding are to form and the figure on the dial will indicate the degree on which to set the miter saw.

In the modification shown in Fig. 6, two semicircular series of graduation marks numbered from 0 to 45, one for each 90°, are arranged on the handle in a circle about the periphery of the dial recess 5, and are for the purpose of indicating the bisecting line of an angle, when it is not practical to use the miter box, as in framing timbers, and so forth. The outside figures on the left of the dial are for use with angles greater than right angles, and those on the right for less than right angles. The zero mark of one of said semi-circular series coincide with the 45 mark of the other series, or, in other words, the two semi-circular series extend continuously about the dial recess 5 in the same direction.

The tool is shown open to 120°, the blade being in the position on the diagrammatic protractor 29 as indicated in Fig. 1, the number indicated on the dial 7 opposite the figure 0 in the outside circle of figures, being 30°. To bisect the angle, close the blade till the figure 30° on the dial is moved around and is located opposite the 30° in the outside circle of figures on the left of the dial. To bisect any angle move the blade toward the handle till the figure indicated on the dial is moved opposite the corresponding figure in the outside circle of figures. To illustrate a practical use of this form of instrument, let us assume that a carpenter wishes to cut two heavy timbers which it is impracticable to place in a miter box; say, for instance, two rafters for a roof, which are to be cut at such an angle that when joined together they will extend at an angle of 120° from each other. To do this the blade 2 is opened to lie at an angle of 120° with relation to the handle 1, said angle being determined in any suitable way, such as by means of a protractor 29. When the blade is in the position mentioned with reference to the handle, the gage mark numbered 30 upon the dial 7 will register with the zero mark upon the handle 1 (Fig. 6). To determine the line upon which the rafter is to be cut in order to form the proper joint as above explained, the angle of 120° must be bisected, as hereinbefore set forth. By folding the blade 2 toward the handle until the gage mark numbered 30 upon the dial 7 registers with the gage mark numbered 30 upon the left-hand side of the handle 1, the edge of the blade 2 will be brought into position to bisect the angle of 120°. It is then only necessary for the carpenter to place the instrument upon the rafter with the edge of the handle 1 along one edge of the rafter, and with the blade 2 lying upon one face of the rafter, and then draw a line upon the rafter along the edge of the blade 2, which line may be followed in sawing the rafter. From this it may be seen that to find the line upon which to cut a pair of members in order to form a joint at any desired angle, it is necessary only to open the blade 2 at the angle with reference to the handle 1 at which the joined members are to extend with each other, and then note the number upon the dial which stands opposite the zero mark upon the handle. The blade is then folded until said number upon the dial registers with the like number upon the proper side of the handle, when the edge of the blade will indicate the proper line upon which to cut the lumber.

I claim as my invention:

1. In a measuring instrument of the character described, a handle, a pair of intermeshing gears in the interior of the handle, a dial rotatably mounted on the handle and operatively connected with one of said gears, a blade having a non-rotatable connection with the other gear for rotating said gears and said dial, the ratio of the first mentioned gear to the last mentioned gear being that of one to four, said dial having a circular series of gage marks upon its outer face and having a series of numbers adjacent to said gage marks, said numbers running consecutively in steps of five from zero to 40, the gage mark numbered zero being coincident with the mark corresponding to that which would be numbered 45, said handle having a zero mark thereon adjacent to said dial, said two zero marks being in register when the blade is at an angle of nienty degrees with the handle.

2. In a measuring instrument of the character described, a handle, a dial pivotally mounted thereon, a blade pivotally mounted on the handle and having a connection with said dial for rotating the latter, said dial having a circular series of gage marks on its outer face, and said handle having two semi-circular series of gage marks surrounding said dial and adapted to coöperate with the gage marks on said dial.

3. In a measuring instrument of the character described, a handle, a dial rotatably mounted thereon, a blade pivotally mounted on the handle and having a connection with said dial for rotating the latter, said dial having a circular series of gage marks on its outer face and having a series of numbers adjacent to said marks running in steps of five from zero to 40, the mark numbered zero being coincident with the mark corresponding to that which would be numbered 45, said handle having two semi-circular series of gage marks encircling said dial, each of the latter series of marks being numbered in steps of five from zero to 40, and the zero mark of one series coinciding with the mark corresponding to 45 of the other series, whereby the two series extend continuously in the same direction about said dial.

In testimony whereof I affix my signature in presence of two witnesses.

CHARLES H. ROBINS.

Witnesses:
CLEMENT WILKINS,
HERMAN KENNELL.

Copies of this patent may be obtained for five cents each, by addressing the "Commissioner of Patents, Washington, D. C."